(12) United States Patent
Miyako (10) Patent No.: US 9,169,947 B2
(45) Date of Patent: Oct. 27, 2015

(54) WATER CATCHMENT PIPE BURYING ASSISTANCE INSTRUMENT AND WATER CATCHMENT PIPE BURYING METHOD EMPLOYING SAME

(71) Applicant: Shigeru Miyako, Sapporo (JP)

(72) Inventor: Shigeru Miyako, Sapporo (JP)

(*) Notice: Subject to any disclaimer, the term of this patent is extended or adjusted under 35 U.S.C. 154(b) by 0 days.

(21) Appl. No.: 14/371,574

(22) PCT Filed: Dec. 7, 2012

(86) PCT No.: PCT/JP2012/081774
§ 371 (c)(1),
(2) Date: Jul. 10, 2014

(87) PCT Pub. No.: WO2013/105371
PCT Pub. Date: Jul. 18, 2013

(65) Prior Publication Data
US 2015/0043974 A1 Feb. 12, 2015

(30) Foreign Application Priority Data
Jan. 13, 2012 (JP) .................................. 2012-004751

(51) Int. Cl.
*F16L 1/028* (2006.01)
*E03B 3/14* (2006.01)
*E02B 11/00* (2006.01)
*E21B 7/20* (2006.01)
*F16L 1/06* (2006.01)

(52) U.S. Cl.
CPC . *F16L 1/028* (2013.01); *E03B 3/14* (2013.01); *E21B 7/20* (2013.01); *F16L 1/06* (2013.01); *E02B 11/005* (2013.01)

(58) Field of Classification Search
CPC ............. E21B 7/20; E21B 43/10; E03B 3/08; E03B 3/11; E03B 3/14; E02B 11/005; F16L 1/028
USPC ............................ 405/184, 184.5; 175/22, 23
See application file for complete search history.

(56) References Cited

U.S. PATENT DOCUMENTS

| | | | | | |
|---|---|---|---|---|---|
| 4,297,055 | A | * | 10/1981 | Peacock | 405/184 |
| 4,318,639 | A | * | 3/1982 | Schosek | 405/184 |
| 4,507,019 | A | * | 3/1985 | Thompson | 405/184.3 |
| 5,104,263 | A | * | 4/1992 | Shibahara et al. | 405/184 |
| 5,173,009 | A | * | 12/1992 | Moriarty | 405/184.3 |
| 5,439,320 | A | * | 8/1995 | Abrams | 405/184.3 |
| 2010/0236828 | A1 | * | 9/2010 | Helge | 175/23 |

FOREIGN PATENT DOCUMENTS

JP 09-291779 A 11/1997

* cited by examiner

*Primary Examiner* — Frederick L Lagman
(74) *Attorney, Agent, or Firm* — Muncy, Geissler, Olds & Lowe, P.C.

(57) ABSTRACT

[Problem] To provide a water catchment pipe burying assistance instrument and a water catchment pipe burying method employing same with which it is possible to bury a resin water catchment pipe without damaging same even when dirt flows into a lead hole. [Solution] Provided is a water catchment pipe burying assistance instrument (1) which is used to bury a water catchment pipe (P) in a lead hole (H) which is drilled in the ground, comprising: a leading end cap (2), which is formed in a cylindrical shape, the leading end side of which is closed and the aft end of which is open, and which further comprises a catchment pipe coupling part (22) which latches and couples with the water catchment pipe (P) on the inner side thereof; and a separation cap (3) which is formed in a cylindrical shape which the water catchment pipe (P) is capable of being inserted into and which is mounted on the aft end side of the leading end cap (2), and which is separated from the leading end cap (2) after the inserted water catchment pipe (P) is coupled to the leading end cap (2).

13 Claims, 8 Drawing Sheets

WATER CATCHMENT PIPE BURYING ASSISTANCE INSTRUMENT AND WATER CATCHMENT PIPE BURYING METHOD EMPLOYING SAME

TECHNICAL FIELD

The present invention relates to a water catchment pipe burying assistance instrument used to bury a water catchment pipe in the ground and a water catchment pipe burying method employing the same.

BACKGROUND ART

Up to now, construction work for burying a water catchment pipe in the ground has been performed for the purpose of land improvement in a well or a soft ground, and various construction methods, burying apparatuses, and the like for burying such a water catchment pipe have been proposed.

For example, Japanese Patent Laid-Open No. 9-291779 proposes a well drilling method including the steps of: (1) drilling a hole up to a predetermined depth by means of an inner rod and an outer rod constituting a double pipe, with the use of a rotary percussion drill, and then pulling out only the inner rod; (2) inserting a water catchment pipe up to a predetermined depth in the outer rod, the water catchment pipe including: a plurality of openings that are provided in a protruding manner on the outer circumferential surface on the lower end side thereof; and a cylindrical protective pipe filter that is made of loofa-brush-like fibers and is attached to the outer circumferences of the openings; (3) pulling out the outer rod; (4) inserting a seal ring from above along the outer circumference of the water catchment pipe up to a predetermined depth of a hole upper portion, and sealing a gap between the inner wall of the hole and the outer circumference of the water catchment pipe; (5) pouring a solidifying agent onto the seal ring and filling the gap up to the land surface with the solidifying agent; and (6) inserting a water lifting pipe into the water catchment pipe up to a predetermined depth and connecting a well pump to the water lifting pipe (Patent Literature 1). According to Patent Literature 1, the well drilling method enables easily providing a small-diameter deep well used in a household and the like.

CITATION LIST

Patent Literature

Patent Literature 1: Japanese Patent Laid-Open No. 9-291779

SUMMARY OF INVENTION

Technical Problem

Figure 16:
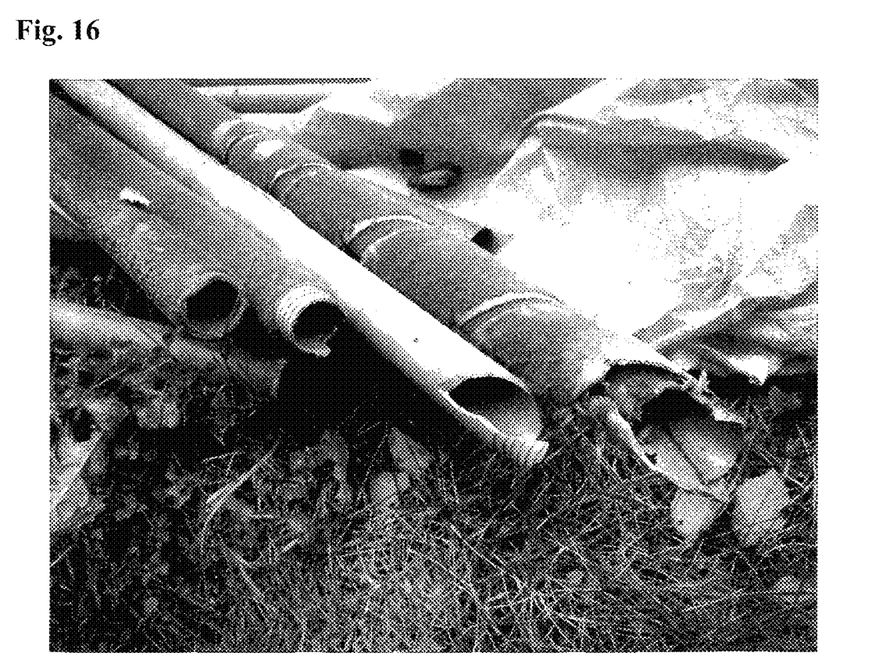
FIG. 16 is a photograph showing a state where a water catchment pipe is damaged as a result of using a conventional water catchment pipe burying method.

The invention described in Patent Literature 1 does not have a problem in the case where a vertical hole such as a well is drilled and where a water catchment pipe is buried. However, the invention described in Patent Literature 1 has the following problem in the case where the drilling direction is a horizontal direction or an upward direction as in land improvement work and the like. That is, if the inner rod is pulled out after the step described in (1), earth and sand flow into the outer rod, and prevent the insertion of the water catchment pipe in the step described in (2). Hence, there is a problem that, if a general water catchment pipe such as a vinyl chloride pipe is forcedly inserted into the outer rod, the water catchment pipe is damaged as illustrated in FIG. 16.

In this case, if the water catchment pipe is made of a material having a high degree of hardness such as a steel pipe, the water catchment pipe can be inserted by pushing-in in some cases, but the use of the steel pipe is extremely costly, and is not economically viable. Accordingly, first, a water catchment pipe such as a vinyl chloride pipe is tried to be actually inserted. Then, in the case where the water catchment pipe may be damaged by pushing-in due to obstruction of earth and sand and the like on the way, the water catchment pipe is pulled out to be replaced with a water catchment pipe such as a steel pipe, which is not damaged even by pushing-in, and the steel pipe needs to be inserted again.

Meanwhile, a budget of construction work in recent years is created on the assumption that a resin pipe such as an inexpensive vinyl chloride pipe is used for a water catchment pipe for budget reasons. Hence, in the case where a vinyl chloride pipe cannot be inserted and is thus replaced with a steel pipe, the work time is wasted, and, in addition, the cost may exceed the budget. In this case, because an extra budget needs to be applied each time, there is a problem that a considerable waste of time occurs.

Further, steel pipes have high strength, but have a problem in durability against corrosion. Hence, customers strongly desire to use resin water catchment pipes excellent in corrosion durability.

The present invention, which has been made in order to solve the above-mentioned problems, has an object to provide a water catchment pipe burying assistance instrument that can bury a resin water catchment pipe without damaging the water catchment pipe even if earth and sand have flown into a prepared hole, as well as a water catchment pipe burying method employing the same.

Solution to Problem

A water catchment pipe burying assistance instrument according to the present invention is a water catchment pipe burying assistance instrument used to bury a water catchment pipe in a prepared hole drilled in ground, including: a leading end cap that is formed in a cylindrical shape having a closed leading end and an opened base end, the leading end cap including a water catchment pipe coupling portion that allows the water catchment pipe to be fitted thereinto for coupling; and a separable pipe that is formed into a cylindrical shape into which the water catchment pipe is insertable, the separable pipe being attached to the base end of the leading end cap and being separated from the leading end cap after the inserted water catchment pipe is coupled to the leading end cap.

Further, according to an aspect of the present invention, the water catchment pipe burying assistance instrument may further include a separable pipe press-holding member that press-holds the separable pipe in a state where a leading end of the separable pipe is attached to the base end of the leading end cap.

Moreover, according to an aspect of the present invention, the separable pipe press-holding member may include: a flanged press-holding portion that presses frontward a protruding portion provided on an inner circumference on the leading end side of the separable pipe and press-holds the separable pipe to the base end of the leading end cap; a coupling shaft that protrudes from the press-holding portion toward the leading end cap and is coupled to the leading end cap by screwing; and a rotation transmitting shaft that transmits, to the coupling shaft, rotational force obtained from a rotation transmitting tool inserted from a base end side of the separable pipe, and cancels the coupling to the leading end cap by descrewing.

Further, according to an aspect of the present invention, the leading end of the leading end cap may be provided with a jet hole for jetting water for removing earth and sand in the prepared hole by water pressure.

Moreover, according to an aspect of the present invention, the inner circumference on the leading end side of the separable pipe may be provided with an earth and sand blocking member that is slid while sealing a gap between the inserted water catchment pipe and the separable pipe, to thereby block earth and sand from flowing in, when the separable pipe is separated from the leading end cap.

Further, according to an aspect of the present invention, the water catchment pipe coupling portion may include a round screw whose screw mountain part and screw valley part are substantially circular in cross section.

Further, a water catchment pipe burying method according to the present invention is a water catchment pipe burying method for burying a water catchment pipe in ground with the use of the water catchment pipe burying assistance instrument, the method including: a prepared hole drilling step of drilling a prepared hole in the ground; an assistance instrument inserting step of inserting the water catchment pipe burying assistance instrument into the prepared hole; a water catchment pipe coupling step of inserting the water catchment pipe into the water catchment pipe burying assistance instrument and coupling a leading end part thereof to the water catchment pipe coupling portion of the leading end cap; and a separable pipe pulling-out step of separating the separable pipe from the leading end cap and pulling out the separable pipe from the prepared hole.

Moreover, a water catchment pipe burying method according to the present invention is a water catchment pipe burying method for burying a water catchment pipe in ground with the use of the water catchment pipe burying assistance instrument, the method including: a prepared hole drilling step of drilling a prepared hole in the ground with the use of a double pipe type hole drilling machine including an outer rod and an inner rod, the outer rod including an outer bit for hole drilling at a leading end thereof, the inner rod being placed inside of the outer rod and including an inner bit for hole drilling at a leading end thereof; an inner rod pulling-out step of pulling out the inner rod from the outer rod; an assistance instrument inserting step of inserting, into the outer rod, the water catchment pipe burying assistance instrument in which the separable pipe is attached to the leading end cap; an outer rod pulling-out step of pulling out the outer rod from the prepared hole; a water catchment pipe coupling step of inserting the water catchment pipe into the water catchment pipe burying assistance instrument and coupling a leading end part thereof to the water catchment pipe coupling portion of the leading end cap; and a separable pipe pulling-out step of separating the separable pipe from the leading end cap and pulling out the separable pipe from the prepared hole.

Advantageous Effects of Invention

According to the present invention, a resin water catchment pipe can be buried without being damaged even if earth and sand have flown into a prepared hole.

DESCRIPTION OF EMBODIMENTS

Figure 1:
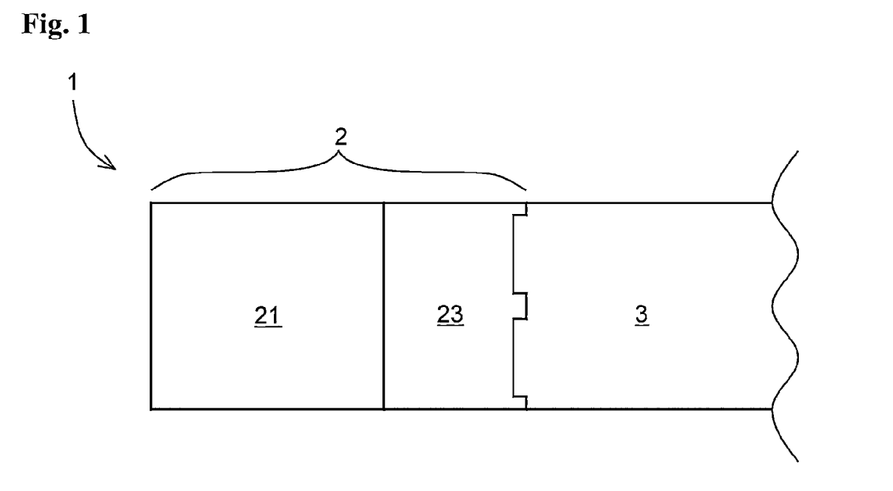
FIG. 1 is a front view illustrating a first embodiment of a water catchment pipe burying assistance instrument according to the present invention.
Figure 2:
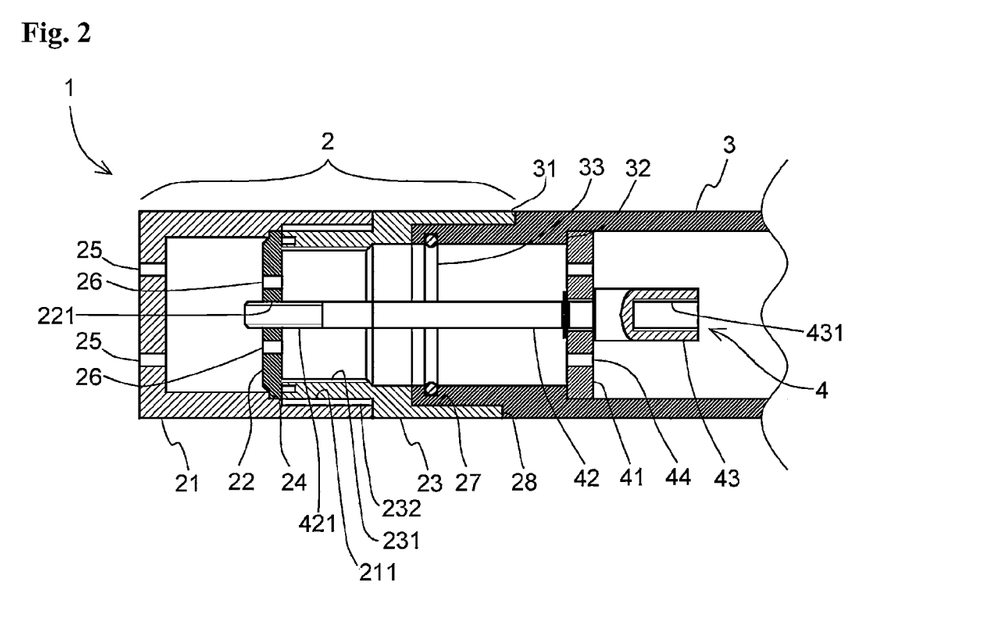
FIG. 2 is a front longitudinal sectional view illustrating a water catchment pipe burying assistance instrument of the first embodiment.

Hereinafter, a first embodiment of a water catchment pipe burying assistance instrument and a water catchment pipe burying method employing the same according to the present invention is described with reference to the drawings. FIG. 1 is a front view illustrating a water catchment pipe burying assistance instrument 1 of the first embodiment, and FIG. 2 is a longitudinal sectional view thereof. Further, FIG. 3 is a perspective assembly view illustrating the water catchment pipe burying assistance instrument 1 of the first embodiment.

Figure 3:
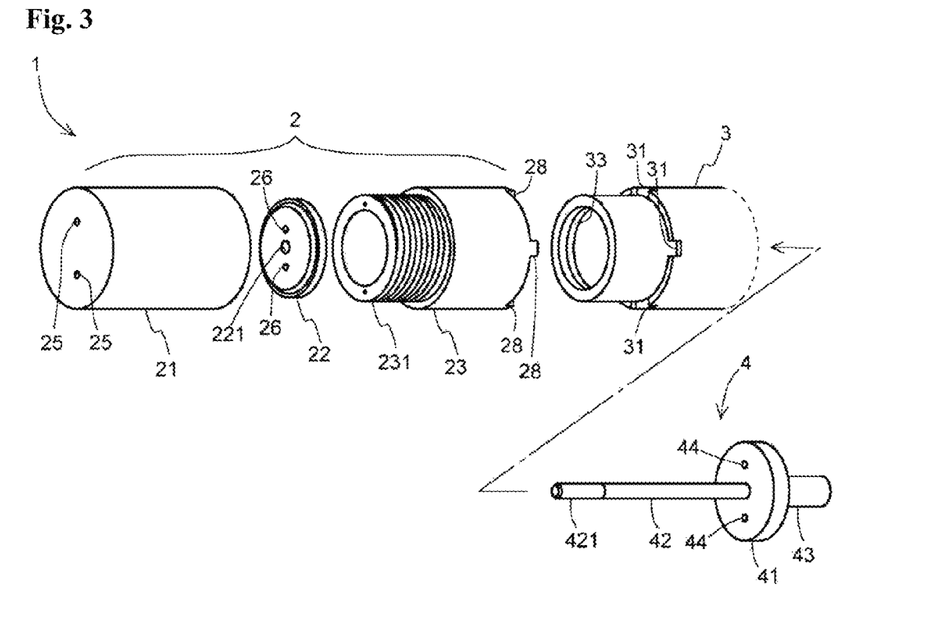
FIG. 3 is a perspective assembly view illustrating the water catchment pipe burying assistance instrument of the first embodiment.

As illustrated in FIG. 1 to FIG. 3, the water catchment pipe burying assistance instrument 1 of the first embodiment mainly includes: a leading end cap 2 that is formed in a cylindrical shape having a closed leading end and an opened base end; and a separable pipe 3 attached to the base end of the leading end cap 2. Hereinafter, each configuration is described in detail.

The leading end cap 2 is made of a steel pipe or the like having strength higher than that of a vinyl chloride pipe or the like in order to prevent damage when the water catchment pipe burying assistance instrument 1 is pushed into a prepared hole H. The leading end cap 2 functions as part of a stopper for attaching the separable pipe 3, and also functions as a cap for preventing earth and sand from flowing in from the leading end of a water catchment pipe P after coupling of the water catchment pipe P. As illustrated in FIG. 2 and FIG. 3, the leading end cap 2 in the first embodiment includes: a cap main body 21 formed into an elongated cylindrical shape; a discoid press-holding member coupling portion 22 (or internal wall) to which a separable pipe press-holding member 4 to be described later is coupled; and a cylindrical water catchment pipe coupling portion 23 to which the leading end part of the water catchment pipe P is coupled.

The cap main body 21 is formed into the elongated cylindrical shape having a closed leading end surface and an opened base end surface, and the inside of the cap main body 21 is hollow. Hence, even if earth and sand invade, the cap main body 21 can store the earth and sand, and prevents the earth and sand from flowing into the water catchment pipe P. Further, as illustrated in FIG. 2 and FIG. 3, a holding groove 24 for locking and holding the press-holding member coupling portion 22 is formed on the inner circumferential surface of the cap main body 1, a female screw 211 is formed on the inner circumferential surface thereof behind the holding groove 24, and the water catchment pipe coupling portion 23 is screwed therewith.

Further, a plurality of (in the first embodiment, two) jet holes 25 capable of jetting hole drilling water poured from behind the separable pipe 3 are formed on the leading end surface of the cap main body 21, and earth and sand in the prepared hole H are removed by water pressure. Note that the number and positions of the formed jet holes 25 are not limited to those in the first embodiment, two or more jet holes 25 may be formed, and the jet holes 25 may be formed on the outer circumferential surface on the leading end side.

As illustrated in FIG. 2 and FIG. 3, the press-holding member coupling portion 22 is made of a discoid steel material at the central position of which a female screw hole 221 is formed, and is coupled to the separable pipe press-holding member 4 to be described later by screwing. Then, the press-holding member coupling portion 22 serves to hold the separable pipe 3 together with the separable pipe press-holding member 4, and also serves to dam earth and sand that have invaded the inside of the cap main body 21 from the jet holes 25. Further, two water flowing holes 26 are formed around the female screw hole 221 of the press-holding member coupling portion 22, and the hole drilling water poured from behind the separable pipe 3 is circulated to the jet holes 25.

As illustrated in FIG. 2, the press-holding member coupling portion 22 is inserted into the base end of the cap main body 21, a front outer circumferential part of the press-holding member coupling portion 22 abuts against the holding groove 24, and a back outer circumferential surface thereof is pressed by the leading end of the water catchment pipe coupling portion 23, whereby the press-holding member coupling portion 22 is sandwiched therebetween.

Note that a method of fixing the press-holding member coupling portion 22 is not limited to sandwiching by the water catchment pipe coupling portion 23. For example, although not illustrated, a male screw may be formed on the outer circumferential surface of the press-holding member coupling portion 22, and the press-holding member coupling portion 22 may be screwed with the cap main body 21. Alternatively, the press-holding member coupling portion 22 may be completely fixed thereto by welding or the like. Alternatively, the press-holding member coupling portion 22 may be formed integrally with the cap main body 21.

As described above, the water catchment pipe coupling portion 23 serves to fix the press-holding member coupling portion 22, also serves as a member to which the separable pipe 3 is fitted for attachment, and further serves as a member with which the water catchment pipe P is screwed to be coupled to the leading end cap 2.

As illustrated in FIG. 1 to FIG. 3, the water catchment pipe coupling portion 23 in the first embodiment is formed into a cylindrical shape. A female screw 231 that is engaged with a male screw 7 formed on the water catchment pipe P is formed on the inner circumferential surface on the leading end side of the water catchment pipe coupling portion 23. A male screw 232 that is engaged with the female screw 211 formed on the cap main body 21 is formed on the outer circumferential surface on the leading end side of the water catchment pipe coupling portion 23. Further, as illustrated in FIG. 2, a fitting groove 27 for fitting the separable pipe 3 is provided on the inner circumferential surface on the base end side of the water catchment pipe coupling portion 23. Moreover, a plurality of engagement protrusions 28 that protrude backward and are engaged with the separable pipe 3 are formed at the base end of the water catchment pipe coupling portion 23.

The engagement protrusions 28 are respectively engaged with a plurality of engagement grooves 31 formed on the outer circumferential surface on the leading end side of the separable pipe 3 to be described later, to thereby couple the water catchment pipe coupling portion 23 to the separable pipe 3 and enable integrated rotation of the two. With this configuration, for example, in the case where the leading end cap 2 is inserted into the prepared hole H and where earth and sand that have flown in are removed by the water pressure of the hole drilling water, the leading end cap 2 and the separable pipe 3 can be inserted while the jetting direction of the hole drilling water is changed by rotating the two in an integrated manner.

Note that, in the first embodiment, as described above, the leading end cap 2 includes the cap main body 21, the press-holding member coupling portion 22, and the water catchment pipe coupling portion 23, which are may be integrally formed.

The separable pipe 3 is made of a steel pipe or the like having high strength similarly to the leading end cap 2. The separable pipe 3 is attached to the base end of the leading end cap 2, and is inserted into the prepared hole H. At the time of insertion of the water catchment pipe P, the separable pipe 3 allows the water catchment pipe P to be inserted thereinto, to thereby function as a guide. After completion of the insertion of the water catchment pipe P, the separable pipe 3 is separated from the leading end cap 2, and is pulled out.

As illustrated in FIG. 2 and FIG. 3, the separable pipe 3 in the first embodiment is formed such that the outer diameter on the leading end side thereof is thinner, in order to enable the separable pipe 3 to be fitted into the fitting groove 27 of the water catchment pipe coupling portion 23. The plurality of engagement grooves 31 that are respectively engaged with the engagement protrusions 28 of the water catchment pipe coupling portion 23 are formed on the base end side of this portion having the thinner outer diameter. Further, as illustrated in FIG. 2, a protruding portion 32 that abuts against and holds the separable pipe press-holding member 4 is provided on the inner circumference on the leading end side of the separable pipe 3.

Moreover, an earth and sand blocking member 33 is provided on the inner wall on the leading end side of the separable pipe 3. When the separable pipe 3 is separated from the leading end cap 2 and is pulled out, the earth and sand blocking member 33 is slid backward while sealing a gap between the internally inserted water catchment pipe P and the separable pipe 3, to thereby block earth and sand from flowing in. As illustrated in FIG. 2 and FIG. 3, the earth and sand blocking member 33 in the present embodiment is made of one O-ring, which is buried in the inner wall of the separable pipe 3. Not limited thereto, the earth and sand blocking member 33 may be selected as appropriate from other seal materials, and a plurality of seal materials may be buried.

Note that the separable pipe 3 has a length equivalent to that of the buried water catchment pipe P, and pipes each having a predetermined length may be prepared as needed, and may be coupled as appropriate so as to have a desired length.

Next, the separable pipe press-holding member 4 is described. The separable pipe press-holding member 4 serves to press-hold and couple the leading end of the separable pipe 3 to the base end of the leading end cap 2. The separable pipe press-holding member 4 also serves to cancel the press-holding state by an operation from the outside and make the separable pipe 3 separable from the leading end cap 2.

Figure 4:
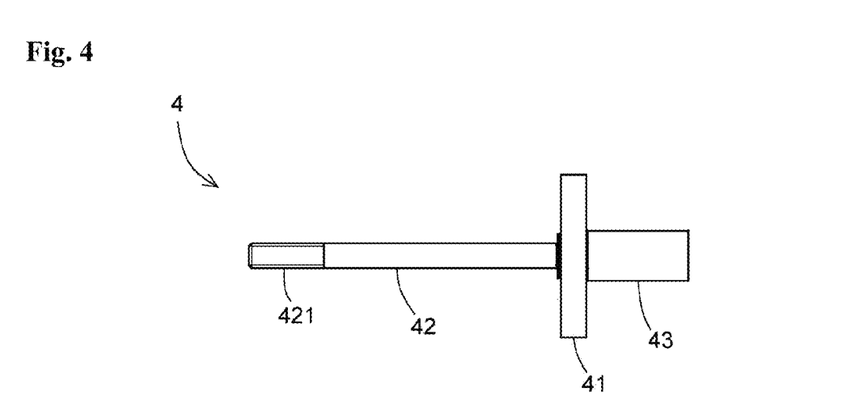
FIG. 4 is a front view illustrating a separable pipe press-holding member in the first embodiment.

As illustrated in FIG. 2 to FIG. 4, the separable pipe press-holding member 4 in the first embodiment abuts against the protruding portion 32 formed on the inner circumference on the leading end side of the separable pipe 3, and is screwed with the female screw hole 221 formed in the press-holding member coupling portion 22 of the leading end cap 2, to thereby couple the separable pipe 3 to the leading end cap 2. Then, the separable pipe press-holding member 4 includes: a flanged press-holding portion 41 that abuts against the protruding portion 32; a coupling shaft 42 including a male screw 421 engaged with the female screw hole 221 of the press-holding member coupling portion 22; and a rotation transmitting shaft 43 that transmits rotational force to the coupling shaft 42.

The press-holding portion 41 has an outer diameter that enables a peripheral part thereof to abut against the protruding portion 32 of the separable pipe 3, and is formed by fitting a discoid steel material to the coupling shaft 42, in the first embodiment. A plurality of circulation holes 44 are formed in the press-holding portion 41, and allow the hole drilling water to circulate therethrough.

The coupling shaft 42 is coupled to the leading end cap 2, to thereby push the press-holding portion 41 against the protruding portion 32 of the separable pipe 3. The male screw 421 engageable with the female screw hole 221 of the press-holding member coupling portion 22 is formed on the leading end side of this steel shaft.

The rotation transmitting shaft 43 is fixed to the base end of the coupling shaft 42, is coupled to a rotation transmitting tool 5 inserted from the base end side of the separable pipe 3, and transmits the rotational force of the rotation transmitting tool 5 to the coupling shaft 42. As illustrated in FIG. 2, a female screw 431 is formed on the inner circumferential surface of a cylindrical steel pipe as the rotation transmitting shaft 43 in the first embodiment, and a male screw 52 of the rotation transmitting tool 5 is engaged with the female screw 431, whereby the rotation transmitting shaft 43 is coupled to the rotation transmitting tool 5. Further, the tightening direction of the female screw 431 is opposite to the tightening direction of the male screw 421 formed at the leading end of the coupling shaft 42, and the rotation direction in which the rotation transmitting tool 5 is operated by screwing is the same as the direction in which the coupling shaft 42 is detached from the press-holding member coupling portion 23 by descrewing.

Figure 5:
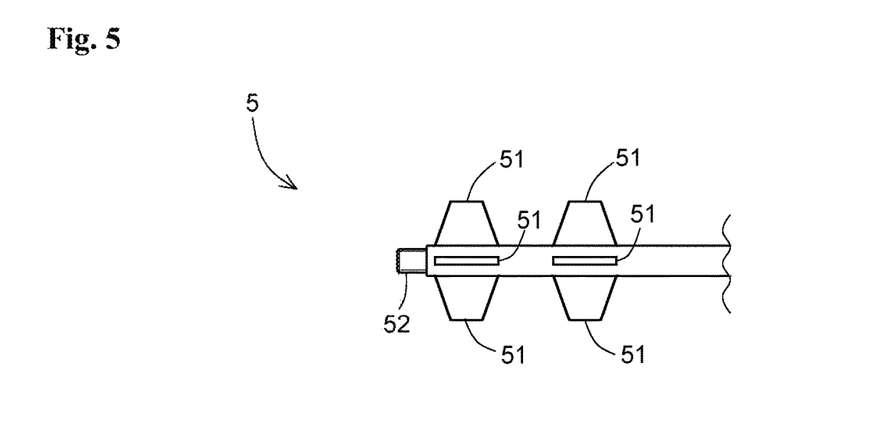
FIG. 5 is a front view illustrating a rotation transmitting tool in the first embodiment.

As illustrated in FIG. 5, the rotation transmitting tool 5 includes the male screw 52 at the leading end thereof, and the male screw 52 is engaged with the rotation transmitting shaft 43. A plurality of guide blades 51 are radially provided for central position alignment in order to reliably engage the male screw 52 with the female screw 431 of the rotation transmitting shaft 43.

Note that a method of coupling the rotation transmitting shaft 43 and the rotation transmitting tool 5 to each other is not limited to such screwing. For example, the rotation transmitting shaft 43 and the rotation transmitting tool 5 may be coupled to each other by fitting convex and concave parts having quadrangular shapes, hexagonal shapes, or the like such that the rotational force can be transmitted.

Further, each screw used in the water catchment pipe burying assistance instrument 1 of the first embodiment is formed as a round screw having high tightening strength with respect to a predetermined pitch and including a screw mountain part and a screw valley part that are substantially circular in cross section.

Further, the water catchment pipe P in the first embodiment is a rigid resin pipe that includes a plurality of water catchment holes and is made of vinyl chloride, and a raised material for enhancing water catchment capability by means of surface tension is attached to the outer circumferential surface of the water catchment pipe P. Further, the male screw 7 coupled to the water catchment pipe coupling portion 23 is provided at the leading end of the water catchment pipe P.

Note that the water catchment pipe P is a generally used pipe, is not limited to a pipe made of vinyl chloride, and is selected as appropriate from, for example, a steel pipe, a schedule pipe, a V throttle pipe, and a CP drain pipe.

Next, an action of each configuration in the water catchment pipe burying assistance instrument 1 of the first embodiment and a water catchment pipe burying method employing the water catchment pipe burying assistance instrument 1 are described.

The water catchment pipe burying method includes: a prepared hole drilling step of drilling the prepared hole H in the ground; an assistance instrument inserting step of inserting the water catchment pipe burying assistance instrument 1 into the prepared hole H; a water catchment pipe coupling step of inserting the water catchment pipe P into the water catchment pipe burying assistance instrument 1 and coupling the leading end part thereof to the water catchment pipe coupling portion 23; and a separable pipe pulling-out step of separating the separable pipe 3 from the leading end cap 2 and pulling out the separable pipe 3 from the prepared hole H. Hereinafter, each step is described in detail.

First, the prepared hole H is drilled in the ground (prepared hole drilling step). Here, a machine that drills the prepared hole H is not particularly limited, and is selected as appropriate from, for example: a rotary boring machine that drills by rotating the tip of a rod having a leading end with a bit; a percussion boring machine that drills by striking a rod having a leading end with a bit; and a rotary percussion boring machine that drills by striking a rod having a leading end with a bit while applying rotational force to the rod. Further, the rod is selected as appropriate from a single pipe type made of one rod, a double pipe type made of an outer rod and an inner rod, and the like. Moreover, the direction of the drilled prepared hole H is selected as appropriate in accordance with the intended use of the water catchment pipe P, and may be a vertical direction, a horizontal direction, and an upward direction.

Figure 6:
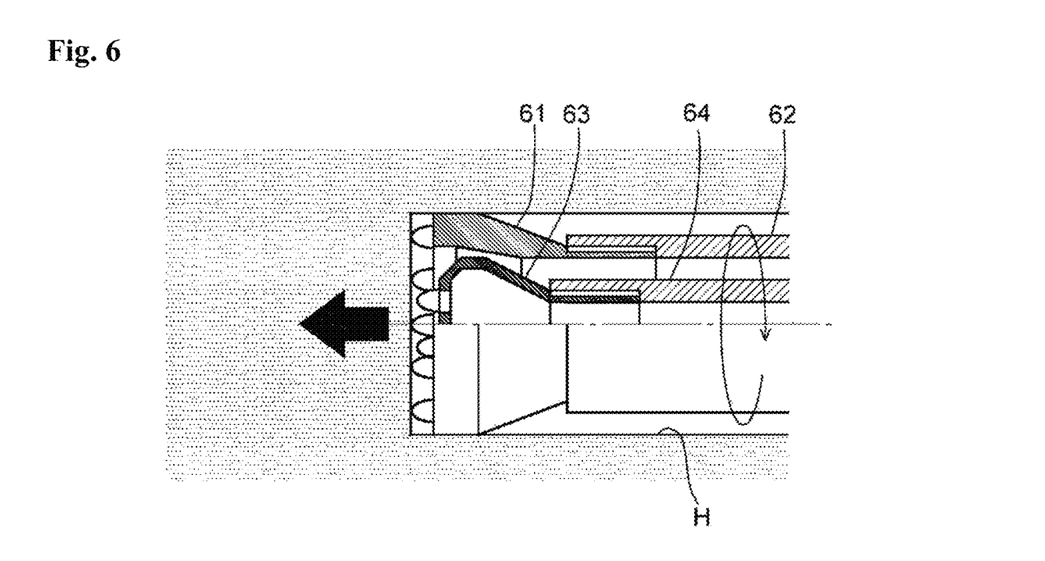
FIG. 6 is a schematic view illustrating a hole drilling operation in a prepared hole drilling step in the first embodiment.

In the prepared hole drilling step in the first embodiment, as illustrated in FIG. 6, a double pipe type hole drilling machine 6 is used. The double pipe type hole drilling machine 6 includes: an outer rod 62 including an outer bit 61 for hole drilling at the leading end thereof; and an inner rod 64 that is placed inside of the outer rod 62 and includes an inner bit 63 for hole drilling at the leading end thereof. The double pipe type hole drilling machine 6 inserts the rods 62, 64 into the ground while rotating the rods 62, 64, to thereby drill the prepared hole H up to a predetermined depth. Then, after the prepared hole H is drilled, the rods 62, 64 are pulled out of the prepared hole H.

Figure 7:
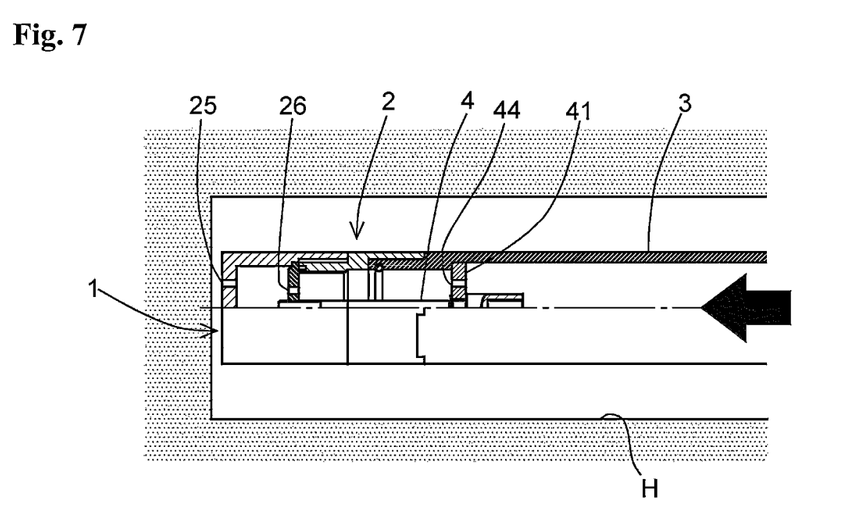
FIG. 7 is a schematic view illustrating an insertion operation in an assistance instrument inserting step in the first embodiment.

Next, as illustrated in FIG. 7, the water catchment pipe burying assistance instrument 1 is inserted up to a predetermined depth of the drilled prepared hole H (assistance instrument inserting step). At this time, the separable pipe 3 is press-held to the leading end cap 2 by the separable pipe press-holding member 4, and is thus prevented from coming off the leading end cap 2. Further, because the water catchment pipe burying assistance instrument 1 is made of a steel pipe or the like having high strength, even if the hole wall of the prepared hole H collapses to some extent or if earth and sand flow therein to some extent, the water catchment pipe burying assistance instrument 1 can be pushed in without being damaged. Moreover, in the first embodiment, the hole drilling water poured from the base end side of the separable pipe 3 passes through the circulation holes 44 provided in the press-holding portion 41 of the separable pipe press-holding member 4 and the water flowing holes 26 opened in the press-holding member coupling portion 22, and is jetted into the prepared hole H from the jet holes 25 formed at the leading end of the leading end cap 2. In this state, the water catchment pipe burying assistance instrument 1 is inserted while the earth and sand and the like are moved by the water pressure of the hole drilling water. Accordingly, the water catchment pipe burying assistance instrument 1 can be reliably and stably inserted into the prepared hole H.

Figure 8:
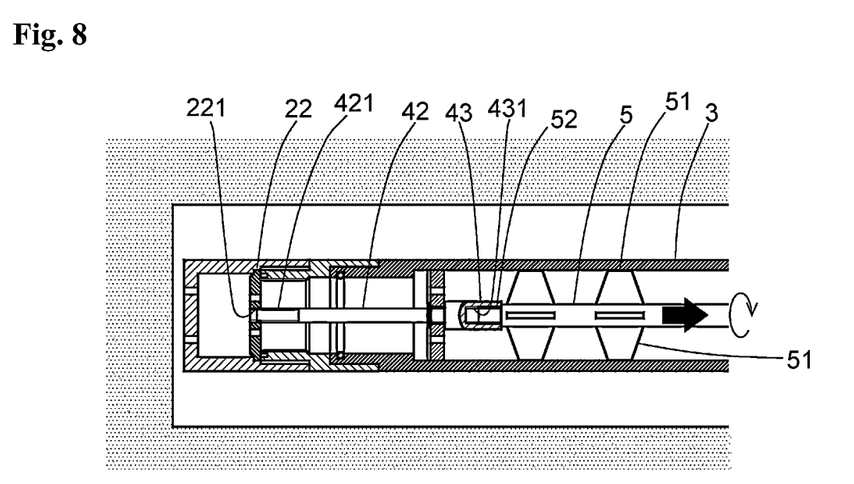
FIG. 8 is a schematic view illustrating an operation of detaching the separable pipe press-holding member in the first embodiment.

Further, in the first embodiment, after the water catchment pipe burying assistance instrument 1 is inserted into the prepared hole H, the separable pipe press-holding member 4 is detached using the rotation transmitting tool 5. Specifically, the rotation transmitting tool 5 is inserted from the base end side of the separable pipe 3, and is then rotated in a predetermined direction upon abutment against the rotation transmitting shaft 43 of the separable pipe press-holding member 4, whereby the male screw 52 at the leading end of the rotation transmitting tool 5 is completely engaged with the female screw 431 of the rotation transmitting shaft 43. Then, if the rotation transmitting tool 5 is further rotated in this direction, the resultant rotational force is transmitted from the rotation transmitting shaft 43 to the coupling shaft 42, so that the coupling shaft 42 is rotated. As described above, the screws respectively provided to the rotation transmitting shaft 43 and the leading end of the coupling shaft 42 are oppositely threaded. Hence, as illustrated in FIG. 8, the male screw 421 at the leading end of the coupling shaft 42 is disengaged from the female screw hole 221 formed in the press-holding member coupling portion 22, and the press-holding force on the separable pipe 3 is cancelled.

The guide blades 51 of the rotation transmitting tool 5 in the first embodiment make the central position of the male screw 52 of the rotation transmitting tool 5 coincident with the central position of the female screw 431 of the rotation transmitting shaft 43, and hence the rotation transmitting tool 5 is reliably screwed with the rotation transmitting shaft 43.

Figure 9:
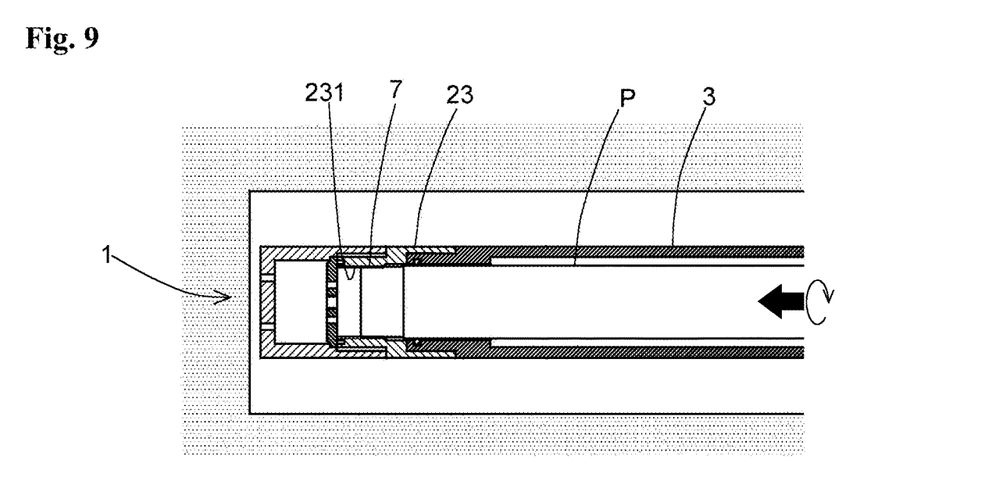
FIG. 9 is a schematic view illustrating a coupling operation in a water catchment pipe coupling step in the first embodiment.

Next, as illustrated in FIG. 9, the water catchment pipe P is inserted into the water catchment pipe burying assistance instrument 1, and the leading end part thereof is coupled to the water catchment pipe coupling portion 23 (water catchment pipe coupling step). At this time, the water catchment pipe P is inserted while being guided inside of the separable pipe 3, and the leading end part thereof reaches the water catchment pipe coupling portion 23. Then, in the first embodiment, the leading end of the water catchment pipe P is fitted into the water catchment pipe coupling portion 23, and the water catchment pipe P is rotationally screwed therewith for coupling. The female screw 231 of the water catchment pipe coupling portion 23 and the male screw 7 at the leading end of the water catchment pipe P are each formed as a round screw, and thus have high tightening force, and do not easily come off.

Figure 10:
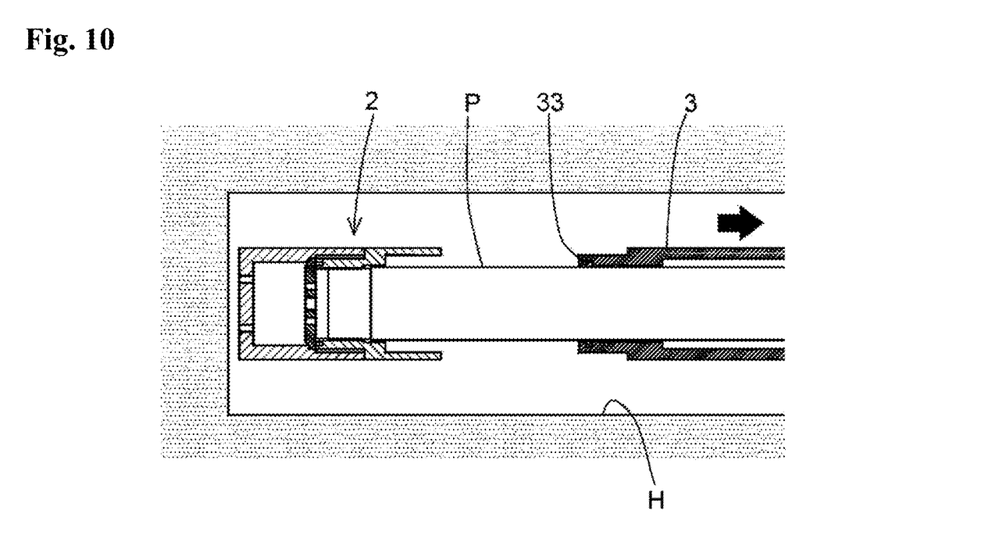
FIG. 10 is a schematic view illustrating a pulling-out operation in a separable pipe pulling-out step in the first embodiment.
Figure 11:
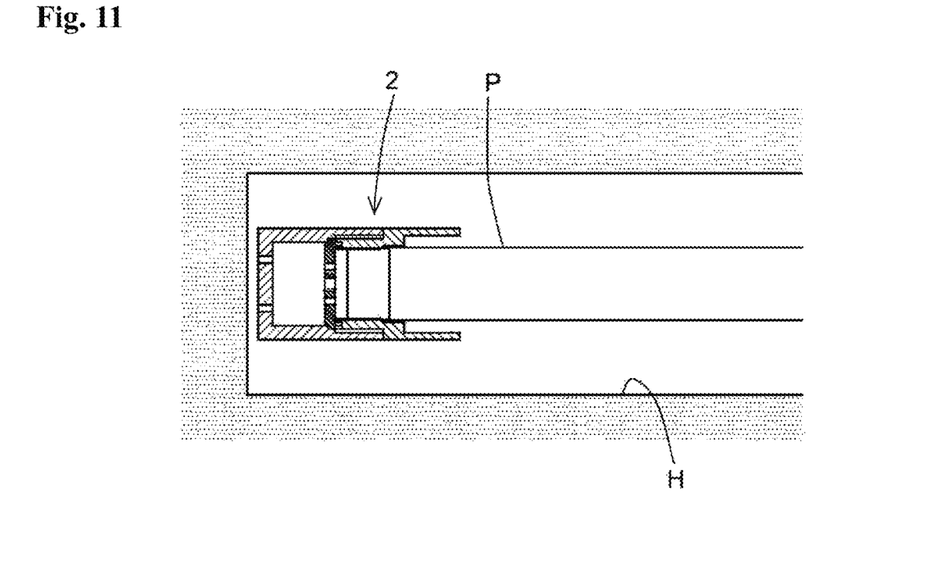
FIG. 11 is a front view illustrating a state where a water catchment pipe is buried in a prepared hole in the first embodiment.

Next, as illustrated in FIG. 10, the separable pipe 3 is separated from the leading end cap 2 and is pulled out of the prepared hole H (separable pipe pulling-out step). At this time, the earth and sand blocking member 33 provided on the inner circumference on the leading end side of the separable pipe 3 is slid backward while sealing a gap between the water catchment pipe P and the separable pipe 3, and thus can block earth and sand from flowing in through the gap. Then, if the separable pipe 3 is completely pulled out of the prepared hole H, as illustrated in FIG. 11, the water catchment pipe P and the leading end cap 2 are left in the prepared hole H, and the work of burying the water catchment pipe P in the ground is completed.

The water catchment pipe burying assistance instrument 1 and the water catchment pipe burying method employing the same according to the first embodiment as described above can produce the following effects.

1. The water catchment pipe burying assistance instrument 1 has high strength, and cannot be damaged at the time of insertion into the prepared hole H.

2. The water catchment pipe burying assistance instrument 1 is inserted into the prepared hole H while the hole drilling water is jetted therefrom to remove earth and sand and the like. Hence, damage of the water catchment pipe burying assistance instrument 1 can be reliably avoided, and the water catchment pipe burying assistance instrument 1 can be stably inserted.

3. When the water catchment pipe burying assistance instrument 1 is inserted, the leading end cap 2 and the separable pipe 3 are fixed to each other by the separable pipe press-holding member 4. Hence, the two are not separated from each other in the course of the insertion.

4. The water catchment pipe P is inserted while being guided inside of the separable pipe 3. Hence, the water catchment pipe P can be reliably and safely inserted into the prepared hole H.

5. The earth and sand blocking member 33 blocks earth and sand from flowing into the gap between the water catchment pipe P and the separable pipe 3. Hence, the earth and sand are prevented from invading the working side, and the separable pipe 3 can be smoothly pulled out.

6. The separable pipe 3 can be repetitively reused after its removal, which is economical.

7. Each screw is formed as a round screw. Hence, the tightening force is strong, and occurrence of chips and the like can be suppressed at the time of manufacture.

Next, a second embodiment of the water catchment pipe burying method according to the present invention is described with reference to the drawings. Note that redundant description of steps equivalent or corresponding to the steps in the first embodiment, of steps in a water catchment pipe burying method of the second embodiment, is omitted.

The water catchment pipe burying method of the second embodiment includes: a prepared hole drilling step of drilling the prepared hole H in the ground with the use of the double pipe type hole drilling machine 6 including the outer rod 62 and the inner rod 64; an inner rod pulling-out step of pulling out the inner rod 64 from the outer rod 62; an assistance instrument inserting step of inserting the water catchment pipe burying assistance instrument 1 into the outer rod 62; an outer rod pulling-out step of pulling out the outer rod 64 from the prepared hole H; a water catchment pipe coupling step of inserting the water catchment pipe P into the water catchment pipe burying assistance instrument 1 and coupling the leading end part thereof to the water catchment pipe coupling portion 23; and a separable pipe pulling-out step of separating the separable pipe 3 from the leading end cap 2 and pulling out the separable pipe 3 from the prepared hole H.

In the prepared hole drilling step in the second embodiment, as illustrated in FIG. 6, the prepared hole H is drilled with the use of the double pipe type hole drilling machine, similarly to the first embodiment.

Figure 12:
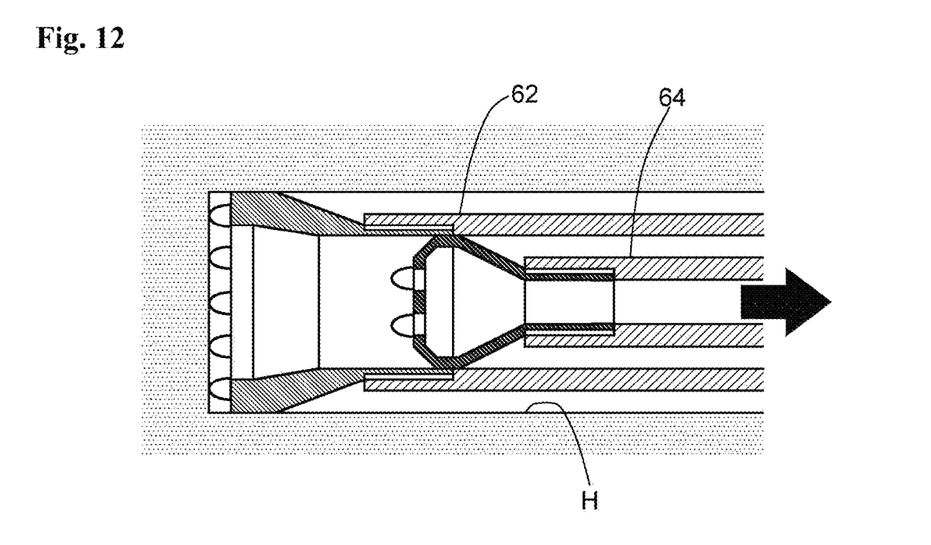
FIG. 12 is a schematic view illustrating an operation in an inner rod pulling-out step in a second embodiment.

Next, as illustrated in FIG. 12, the inner rod 64 is pulled out of the outer rod 62, and the outer rod 62 is left in the prepared hole H (inner rod pulling-out step). If the outer rod 62 is left in the prepared hole H in this way, in the case where the ground in which the prepared hole H is drilled is soft and where the prepared hole H may collapse, the collapse of the prepared hole H can be prevented, and the water catchment pipe burying assistance instrument 1 can be stably inserted up to a predetermined depth.

Figure 13:
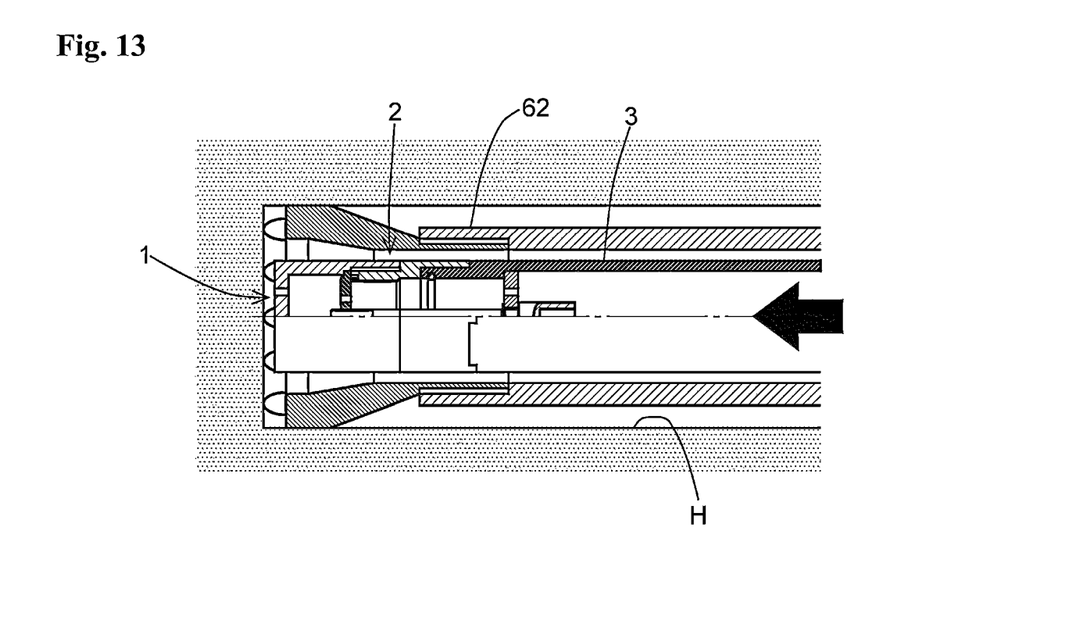
FIG. 13 is a schematic view illustrating a coupling operation in a water catchment pipe coupling step in the second embodiment.
Figure 14:
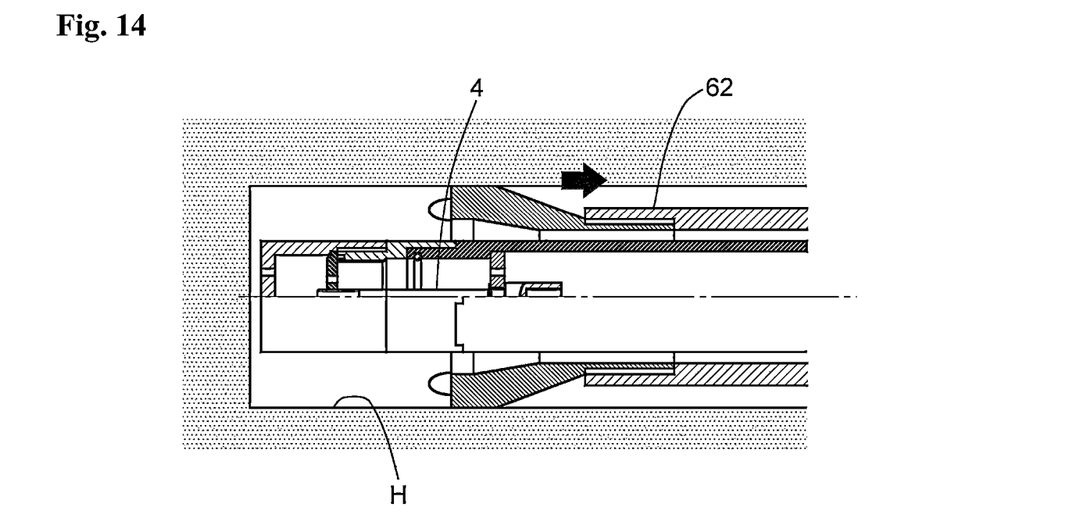
FIG. 14 is a schematic view illustrating an operation in an outer rod pulling-out step in the second embodiment.

In the assistance instrument inserting step in the second embodiment, as illustrated in FIG. 13, the water catchment pipe burying assistance instrument 1 in which the separable pipe 3 is attached to the leading end cap 2 is inserted into the outer rod 62 left in the prepared hole H. In the case where earth and sand and the like have flown into the outer rod 62 from the leading end side, the water catchment pipe burying assistance instrument 1 is inserted while the hole drilling water is jetted, similarly to the first embodiment, whereby the water catchment pipe burying assistance instrument 1 can be more reliably inserted into the outer rod 62.

Next, the outer rod 62 is pulled out of the prepared hole H (outer rod pulling-out step). If the outer rod 62 is pulled out in this way, the state where the water catchment pipe burying assistance instrument 1 is inserted in the prepared hole H can be made similarly to the state after the assistance instrument inserting step in the first embodiment.

Note that the separable pipe press-holding member 4 may be detached before the outer rod pulling-out step, and may be detached after the outer rod pulling-out step.

Then, the steps after the outer rod pulling-out step are similar to those in the first embodiment. As illustrated in FIG. 9 to FIG. 11, the water catchment pipe coupling step and the separable pipe pulling-out step are performed, and the work of burying the water catchment pipe P in the prepared hole H is completed.

According to the water catchment pipe burying method employing the water catchment pipe burying assistance instrument 1 of the second embodiment described above, the water catchment pipe P can be reliably buried in the case where the ground is soft and where the prepared hole may collapse.

Note that the water catchment pipe burying assistance instrument 1 and the water catchment pipe burying method employing the same according to the present invention are not limited to the above-mentioned embodiments, and can be changed as appropriate.

For example, it is possible to adopt a configuration in which: the leading end cap 2 and the separable pipe 3 are coupled to each other; the separable pipe press-holding member 4 can be broken by an operation of applying a predetermined load; and the press-holding state can be cancelled by the breakage. Alternatively, it is also possible to adopt a configuration in which: the leading end cap 2 and the separable pipe 3 are coupled to each other by screws; the water catchment pipe P is fixed to the leading end cap 2; then, only the separable pipe 3 is rotated while the water catchment pipe P is held; and the separable pipe 3 is thus separated.

Figure 15:
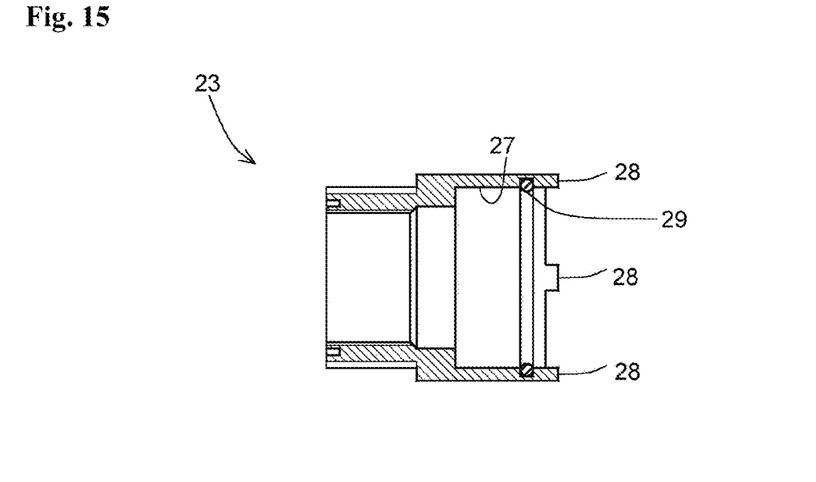
FIG. 15 is a front longitudinal sectional view illustrating a water catchment pipe coupling portion in another embodiment.

Further, as illustrated in FIG. 15, a seal material 29 such as an O-ring may be provided on the inner wall on the base end side of the water catchment pipe coupling portion 23. The seal material 29 is slid while sealing a gap between the water catchment pipe coupling portion 23 and the separable pipe 3, to thereby block earth and sand from flowing in, until the separable pipe 3 is completely separated from the water catchment pipe coupling portion 23.

Moreover, the water catchment pipe burying assistance instrument 1 and the water catchment pipe burying method employing the same according to the present invention may be applied to not only burying of a water catchment pipe but also burying of an underground pipe for heat exchange, burying of measurement instruments such as a dipmeter and a strainmeter for geological observation, burying of a lightning rod, burying of an anchor used in slope work, and the like.

REFERENCE SIGNS LIST 1 water catchment pipe burying assistance instrument
2 leading end cap
3 separable pipe
4 separable pipe press-holding member
5 rotation transmitting tool
6 double pipe type hole drilling machine
7 male screw
21 cap main body
22 press-holding member coupling portion
23 water catchment pipe coupling portion
24 holding groove
25 jet hole
26 water flowing hole
27 fitting groove
28 engagement protrusion
29 seal material
31 engagement groove
32 protruding portion
33 earth and sand blocking member
41 press-holding portion
42 coupling shaft
43 rotation transmitting shaft
44 circulation hole
51 guide blade
52 male screw
61 outer bit
62 outer rod
63 inner bit
64 inner rod
211 female screw
221 female screw hole
231 female screw
232 male screw
421 male screw
431 female screw
P water catchment pipe
H prepared hole

The invention claimed is:
1. A water catchment pipe burying assistance instrument used to bury a water catchment pipe in a prepared hole drilled in ground, comprising:
a leading end cap that is formed in a cylindrical shape having a closed leading end and an opened base end, the leading end cap including a water catchment pipe coupling portion that has a circular hollow portion inside with an inner diameter, the inner diameter being substantially the same as an outer diameter of a leading end part of the water catchment pipe so that the leading end part of the water catchment pipe is coupled to the leading end cap; and a separable pipe that is formed into a cylindrical shape into which the water catchment pipe is insertable, the separable pipe being attached to the base end of the leading end cap and being separated from the leading end cap after the inserted water catchment pipe is coupled to the leading end cap.

2. The water catchment pipe burying assistance instrument according to claim 1, further comprising a separable pipe press-holding member that press-holds the separable pipe in a state where a leading end of the separable pipe is attached to the base end of the leading end cap.

3. The water catchment pipe burying assistance instrument according to claim 2, wherein the separable pipe press-holding member includes:

a flanged press-holding portion that presses frontward a protruding portion provided on an inner circumference on the leading end side of the separable pipe and press-holds the separable pipe to the base end of the leading end cap;

a coupling shaft that protrudes from the press-holding portion toward the leading end cap and is coupled to the leading end cap by screwing; and a rotation transmitting shaft that transmits, to the coupling shaft, rotational force obtained from a rotation transmitting tool inserted from a base end side of the separable pipe, and cancels the coupling to the leading end cap by descrewing.

4. The water catchment pipe burying assistance instrument according to claim 1, wherein the leading end of the leading end cap is provided with a jet hole for jetting water for removing earth and sand in the prepared hole by water pressure.

5. The water catchment pipe burying assistance instrument according to claim 1, wherein the inner circumference on the leading end side of the separable pipe is provided with an earth and sand blocking member that is slid while sealing a gap between the inserted water catchment pipe and the separable pipe, to thereby block earth and sand from flowing in, when the separable pipe is separated from the leading end cap.

6. The water catchment pipe burying assistance instrument according to claim 1, wherein the water catchment pipe coupling portion includes a round screw whose screw mountain part and screw valley part are substantially circular in cross section.

7. A water catchment pipe burying method for burying a water catchment pipe in ground with the use of a water catchment pipe burying assistance instrument including: a leading end cap that is formed in a cylindrical shape having a closed leading end and an opened base end, the leading end cap including a water catchment pipe coupling portion that has a circular hollow portion inside with an inner diameter, the inner diameter being substantially the same as an outer diameter of a leading end of the water catchment pipe so that the leading end of the water catchment pipe is coupled to the water catchment pipe coupling portion; and a separable pipe that is formed into a cylindrical shape into which the water catchment pipe is insertable, the separable pipe being attached to the base end of the leading end cap and being separated from the leading end cap after the inserted water catchment pipe is coupled to the leading end cap, the method comprising:

a prepared hole drilling step of drilling a prepared hole in the ground;

an assistance instrument inserting step of inserting the water catchment pipe burying assistance instrument into the prepared hole;

a water catchment pipe coupling step of inserting the water catchment pipe into the water catchment pipe burying assistance instrument and coupling a leading end part of the water catchment pipe to the water catchment pipe coupling portion of the leading end cap; and a separable pipe pulling-out step of separating the separable pipe from the leading end cap and pulling out the separable pipe from the prepared hole.

8. A water catchment pipe burying method for burying a water catchment pipe in ground with the use of a water catchment pipe burying assistance instrument including: a leading end cap that is formed in a cylindrical shape having a closed leading end and an opened base end, the leading end cap including a water catchment pipe coupling portion that allows the water catchment pipe to be fitted thereinto for coupling; and a separable pipe that is formed into a cylindrical shape into which the water catchment pipe is insertable, the separable pipe being attached to the base end of the leading end cap and being separated from the leading end cap after the inserted water catchment pipe is coupled to the leading end cap, the method comprising:

a prepared hole drilling step of drilling a prepared hole in the ground with the use of a double pipe type hole drilling machine including an outer rod and an inner rod, the outer rod including an outer bit for hole drilling at a leading end thereof, the inner rod being placed inside of the outer rod and including an inner bit for hole drilling at a leading end thereof;

an inner rod pulling-out step of pulling out the inner rod from the outer rod;

an assistance instrument inserting step of inserting, into the outer rod, the water catchment pipe burying assistance instrument in which the separable pipe is attached to the leading end cap;

an outer rod pulling-out step of pulling out the outer rod from the prepared hole;

a water catchment pipe coupling step of inserting the water catchment pipe into the water catchment pipe burying assistance instrument and coupling a leading end part thereof to the water catchment pipe coupling portion of the leading end cap; and a separable pipe pulling-out step of separating the separable pipe from the leading end cap and pulling out the separable pipe from the prepared hole.

9. A leading end cap (2) used to be coupled to a leading end part of a water catchment pipe buried in a ground, comprising:

a cap main body (21) that is formed in a cylindrical shape having a closed leading end at a leading side and an open base end at a trailing side, which is an opposite side from the leading side in an axial direction, a water catchment pipe coupling portion (23) that is formed in a cylindrical shape, is inserted to the cap main body from the open base to be coupled therewith, and has a circular hollow portion inside with an inner diameter, the inner diameter being substantially the same as an outer diameter of the leading end part of the water catchment pipe so that the leading end part of the water catchment pipe is coupled to the leading end cap.

10. The leading end cap of claim 9, further comprising:

an internal wall (22) that is a cap to cover a leading end of the water catchment pipe coupling portion, wherein the internal wall is arranged inside the cap main body and at the leading end of the water catchment pipe coupling portion with a predetermined distance from the leading end of the cap main body so that a hollow space is maintained inside the cap main body.

11. The leading end cap of claim 10, wherein
the leading end of the cap main body is provided with a jet hole (25) for jetting water that is supplied through the water catchment pipe coupling portion, and
the internal wall is provided with another jet hole (26) for jetting the water.

12. The leading end cap of claim 9, wherein
the water catchment pipe coupling portion has an engagement means (28) at a trailing end for engaging a separable pipe (3) that is to be connected to the leading end cap while the water catchment pipe is installed and to be removed from the engagement means after the installation of the water catchment pipe is completed.

13. The leading end cap of claim 9, wherein
the leading end of the cap main body is provided with a jet hole (25) for jetting water that is supplied through the water catchment pipe coupling portion.

\* \* \* \* \*